(12) United States Patent
Patterson et al.

(10) Patent No.: US 7,788,259 B2
(45) Date of Patent: Aug. 31, 2010

(54) LOCATING, VIEWING AND INTERACTING WITH INFORMATION SOURCES

(75) Inventors: Eric W. Patterson, Sammamish, WA (US); Kristin Michele Tolle, Redmond, WA (US); Alexander Martynov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 11/490,762

(22) Filed: Jul. 21, 2006

(65) Prior Publication Data

US 2008/0021932 A1 Jan. 24, 2008

(51) Int. Cl.
G06F 7/00 (2006.01)
G06F 17/30 (2006.01)
G06F 15/16 (2006.01)
G07G 1/00 (2006.01)

(52) U.S. Cl. .................... 707/726; 705/10; 709/207
(58) Field of Classification Search ............ 707/205
See application file for complete search history.

(56) References Cited

U.S. PATENT DOCUMENTS

| 5,564,044 | A | 10/1996 | Pratt ........................ 718/106 |
| 5,729,745 | A | 3/1998 | Reina et al. ................ 719/315 |
| 6,233,578 | B1 | 5/2001 | Machihara et al. ........... 707/10 |
| 6,564,229 | B1* | 5/2003 | Baweja et al. .............. 707/741 |
| 6,874,004 | B2* | 3/2005 | Jolly ........................ 707/205 |
| 6,931,423 | B2* | 8/2005 | Sexton et al. ............... 707/205 |
| 7,007,049 | B2* | 2/2006 | Peng ......................... 707/205 |
| 2001/0004737 | A1 | 6/2001 | Laux ........................... 707/1 |
| 2003/0182287 | A1 | 9/2003 | Parlanti ...................... 707/10 |
| 2003/0182330 | A1* | 9/2003 | Manley et al. .............. 707/205 |
| 2004/0010545 | A1* | 1/2004 | Pandya ...................... 709/203 |
| 2004/0148270 | A1 | 7/2004 | McKay et al. ................ 707/1 |
| 2005/0050023 | A1* | 3/2005 | Gosse et al. .................. 707/3 |
| 2005/0131971 | A1* | 6/2005 | James et al. ................ 707/205 |
| 2005/0216537 | A1* | 9/2005 | Jiang et al. .................. 707/205 |
| 2005/0235014 | A1* | 10/2005 | Schauser et al. ............ 707/204 |

(Continued)

FOREIGN PATENT DOCUMENTS

WO   WO9527254   10/1995
WO   WO0075849   12/2000

OTHER PUBLICATIONS

Yeliz Yesilada; COHSE; Dynamic Linking of Web Resources; ACM; pp. 4-15.*

(Continued)

*Primary Examiner*—Neveen Abel Jalil
*Assistant Examiner*—Jermaine Mincey
(74) *Attorney, Agent, or Firm*—Merchant & Gould (57) ABSTRACT

A user interface is provided for allowing a user to quickly and easily connect to data and other informational sources. A user can use a user interface to interact with a collection of connection files to quickly and easily connect to various data sources and other informational sources. The user interface is configured to make data sources available at a glance, providing a user with a convenient and comprehensive display of the data sources. The user interface is designed to be a simplified experience for data import that is helpful to both novice and more experienced users in that the data is presented simply without a lot of extraneous information.

18 Claims, 7 Drawing Sheets

U.S. PATENT DOCUMENTS

| | | | |
|---|---|---|---|
| 2005/0251501 A1 | 11/2005 | Phillips et al. | 707/2 |
| 2006/0041605 A1* | 2/2006 | King et al. | 707/205 |
| 2006/0047780 A1* | 3/2006 | Patnude | 709/219 |
| 2006/0075323 A1 | 4/2006 | Singh et al. | 715/500 |
| 2006/0089929 A1 | 4/2006 | Morikawa | 707/4 |
| 2006/0136528 A1* | 6/2006 | Martin et al. | 707/205 |
| 2008/0010266 A1* | 1/2008 | Brunn et al. | 707/5 |

OTHER PUBLICATIONS

Visual FoxPro—Data Selection with Application Builder—Date is unknown http://msdn.microsoft.com/library/default.asp?url=/library/en-us/fox7help/html/cmdApplication_Builder_Adding_Data.asp?frame=true&hidetoc=true.

Lidax Quick Start Guide—May 2001 http://www.ligo-wa.caltech.edu/gds/fantom/quickstart/quickstart.html.

Import financial data into Excel from various sources—Date is unknown http://office.microsoft.com/en-gb/assistance/ha010864661033.aspx.

Willow Technical Report: User Interface—Jun. 1999 http://www.washington.edu/willow/interface.html.

* cited by examiner

LOCATING, VIEWING AND INTERACTING WITH INFORMATION SOURCES

BACKGROUND

In today's computer-driven world, it is not uncommon for a user to rely upon multiple data sources in day-to-day activities. For example, a user may access and use many different data sources over a period of time. It becomes unmanageable for a user to track all of the different data sources, especially for users who rely on expediency and efficiency when using various data sources. To further complicate things, the data sources may be located on and/or associated with many different systems. For example, it is not uncommon for data to be stored remotely on different servers, as a well as locally on one or more user workstations, servers, handhelds, etc.

Correspondingly, it can be difficult in productivity applications to successfully find and connect to data for analysis. This includes applications such as MICROSOFT EXCEL, MICROSOFT WORD, MICROSOFT VISIO, and other applications. For example, setting up a connection to a database in EXCEL is a task that many users struggle with. If a user wants to connect to an open database connectivity (ODBC) data source or structured query language (SQL) Server Analysis Services cube, the user must know server names, cube names, table names, what type of connection to create, user credentials (e.g. username, password), etc. This can typically require multiple clicks and navigation through multiple menus, which requires knowledge of the procedure(s) and data source(s). Thus, in current applications, users are required to know a lot about various data sources in order to locate an existing data connection and/or create a new data connection, which can be a frustrating, time-consuming, and, in many instances, an unsuccessful process.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide a user interface allowing a user to quickly and easily connect to data and other informational sources. In an embodiment, a user interface allows a user to interact with a collection of connection files to quickly and easily connect to server and other data sources. The user interface is configured to make data sources available at a glance, providing a user with a convenient and comprehensive display of various data sources. The user interface is designed to be a simplified experience for data import that is helpful to both novice and more experienced users in that the data is presented simply without a lot of extraneous information.

In various embodiments, a user can simultaneously see local connections, server connections, and/or other data sources, by way of a source locator application that is configured to locate and collect various data sources. The various data sources can then be presented in an interface with contextual information about each source for easy selection and manipulation. According to an embodiment, an administrator can use a programming interface to "push" or share data sources with various users. For example, various local connections and a list of server and data sources can be set up by an administrator and presented to a user according to the user's historical use of various data sources. The user interface can be configured according to preference.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments provide a user interface for interaction with one or more data sources. In an embodiment, a user interface allows a user to quickly and easily connect to server and other data sources. The user interface is configured to make data sources available at a glance, providing a user with an "at a glance" display of the data sources. The user interface is designed to be a simplified experience for data import that is helpful to both novice and more experienced users in that the data is presented simply without a lot of extraneous information. In various embodiments, a user can simultaneously see local connections, a list of server connections, and other data sources, by merging different data sources into an interface with contextual information about each source for easy selection and manipulation. According to an embodiment, an administrator can "push" data sources to users according to a user's preference or history. The user interface can be configured according to preference.

Various embodiments are configured to simplify the process of importing and exposing external data into an application, such as a spreadsheet application, database application, word processing application, drawing application, etc. An embodiment is configured to provide relevant server and local external data sources, including a user interface which exposes and highlights server and other data collections and sources. The user interface presents various data sources using familiar names and descriptions to simplify the location and/or use of the data sources without requiring excessive browsing.

Figure 1:
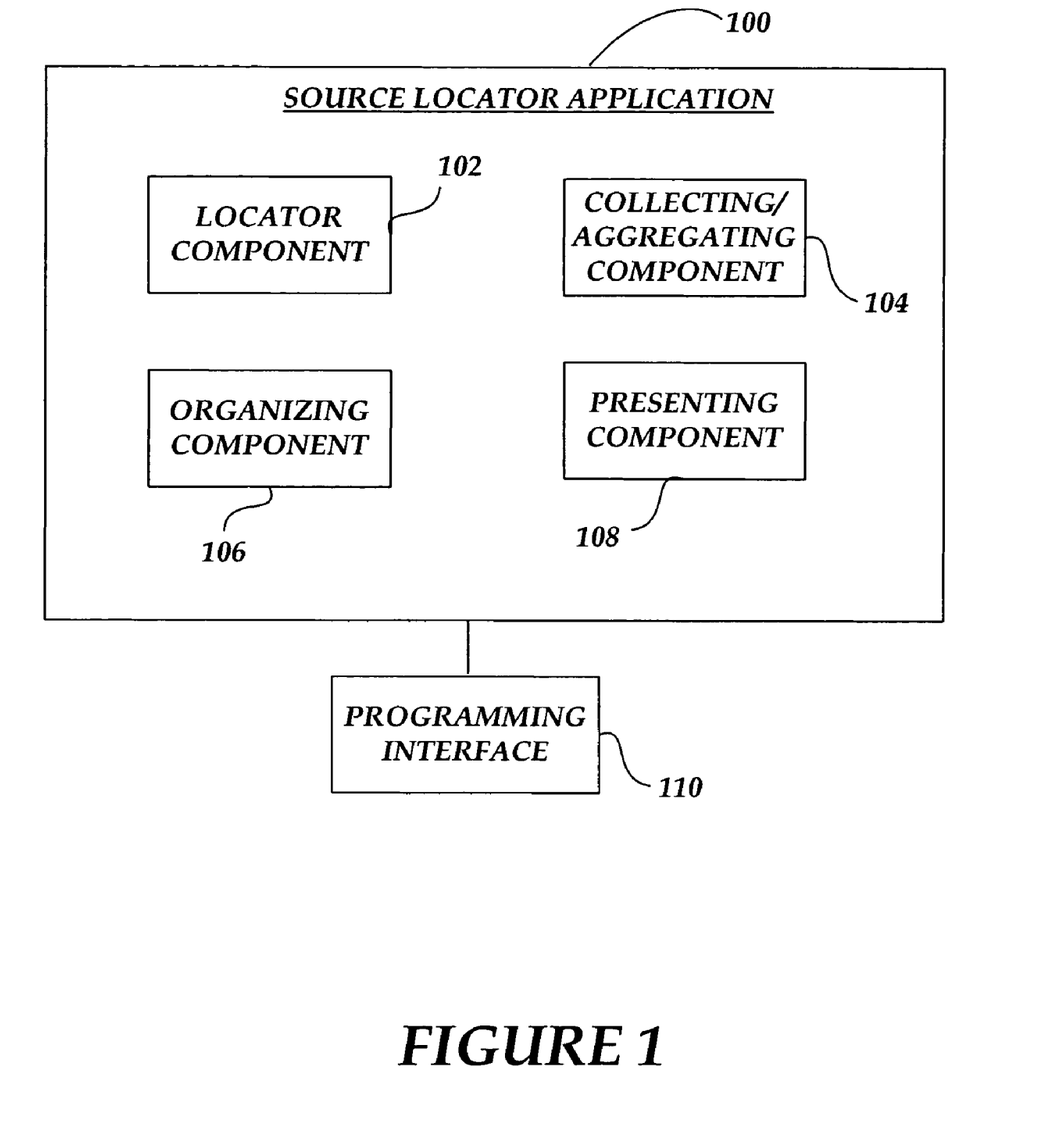
FIG. 1 depicts a block diagram of a source locator application.

FIG. 1 depicts a block diagram of a source locator application 100, according to an embodiment. As described below, the source locator application 100 is configured and can be used to locate, collect, and/or present one or more connections, such as one or more connection files, in a convenient, comprehensive, and organized display or user interface. Connection files can be stored on a local, remote, or other system. The connection files delineate data or other informational sources that a user has connected to and/or accessed at some time. A connection file can be tailored to contain information that is necessary to locate and/or track a data source.

The source locator application 100 can be used to share a connection to a data source, so that subsequent users can readily connect to the data source without having to go through many different paths or informational layers to locate the data source. Once a user has successfully located and/or connected to a data source, the source locator application 100 can be used to share the successful connection with others, so that subsequent users can readily connect to the data source. Therefore, subsequent users do not have to remember all of the details and/or find instructions that are necessary to locate and connect to a data source.

As described below, a subsequent user can use a user interface (see FIGS. 3-5) to interact with one or more connection files that are associated with one or more data sources. The one or more connection files are conveniently presented in one location via the user interface. In an embodiment, once a user has successfully connected to a data source, the connection file associated with the data source can be stored to storage, such as RAM, or some other accessible medium of storage. The connection file associated with a data source also may be communicated to or shared with other users in various ways, including, but not limited to, e-mail, removable disk, file transfer, or some other method, wherein the data source is then provided in the display or user interface.

As described below, the source locator application 100 can be called when another application, such as a spreadsheet application, OFFICE application, etc., is attempting to locate and/or connect to a data source. As shown in FIG. 1, the source locator application 100 includes a locator component 102, a collecting/aggregating component 104, an organizing component 106, and a presenting component 108. The locator component 102 is configured to locate one or more connection files associated with one or more data sources. The collecting/aggregating component 104 is configured to collect/aggregate the one or more connection files. The organizing component 106 is configured to organize the one or more collected connection files by a given criteria, such as by type for example. The presenting component 108 is configured to present the organized collection of connection files in a user-friendly display.

In an embodiment, the locator component 102 is configured to locate and access one or more library files, such as a data connection library (DCL) file for example, to locate and access one or more connection files, such as one or more office data connection (ODC) files for example. A DCL is a folder or group of files with special properties including associations for storing connections in that folder. The locator component 102 is also configured to locate and access one or more registry files to locate and access one or more registry keys associated with one or more data sources. The locator component 102 is further configured to locate and access one or more connection files associated with one or more data sources (e.g. external, etc.) of a spreadsheet application, such as a workbook connection for example.

In an embodiment, the locator component 102 is configured to poll one or more servers (e.g. OFFICE servers, SHAREPOINT servers, etc.) to determine whether any connections are to be shared. The pointer or path to any shared connections is returned and stored in a registry or other location for that individual user. As known to those skilled in the art, a registry may contain a list of file paths, including connection files, paths to a SHAREPOINT library that also contain connection files, and/or other paths. An example registry is configured to store configuration information including, but not limited to: file associations and object linking and embedding (OLE) information; user preferences; all current user information for each user of a system; hardware, operating system, and installed application settings; external device settings; and/or performance data.

Once the locator component 102 has located relevant registries and/or other informational stores associated with one or more data sources, the collecting/aggregating component 104 is configured to collect or aggregate the located connection files and/or other files. Once the collecting/aggregating component 104 has collected the various files, the organizing component 106 is configured to organize the collected files. Once organized, the presenting component 108 is configured to present the collection of organized files to a user using a user interface (see FIGS. 3-5). Thereafter, a user can interact with the user interface to select, modify, and/or add a connection file and/or other file that is associated with a data source.

In an embodiment, a programming interface 110 can be used to interact with the source locator application 100. The programming interface 110 is a tool that a user, such as a programmer, can use to make requests of the source locator application 100. For example, an administrator can use the programming interface 110 to create and/or modify connection files that include server names, cube names, table names, connection type, user credentials (e.g. username, password), and other information associated with the connection files. Once connection files have been created and/or modified, the administrator can use the programming interface 110 to push the connection files to one or more users. Thereafter, a user can view and interact with the connection files using a user interface, such as the user interface described below.

As an example, an administrator can bind a data access page to a different data source or to a previously used data source that has been moved to a new location. The administrator can bind the data source by assigning a property associated with the data source to an ODC file. As described above, ODC files contain the information and parameters that are required to form a data connection. The information can include, but is not limited to: a server name; OLAP cube; table name; query; and other information and parameter associations. The DCL is a library having a number of features, such as: workflow support, file approval, library level/item level security, and sorting filtering based on metadata.

Figure 2:
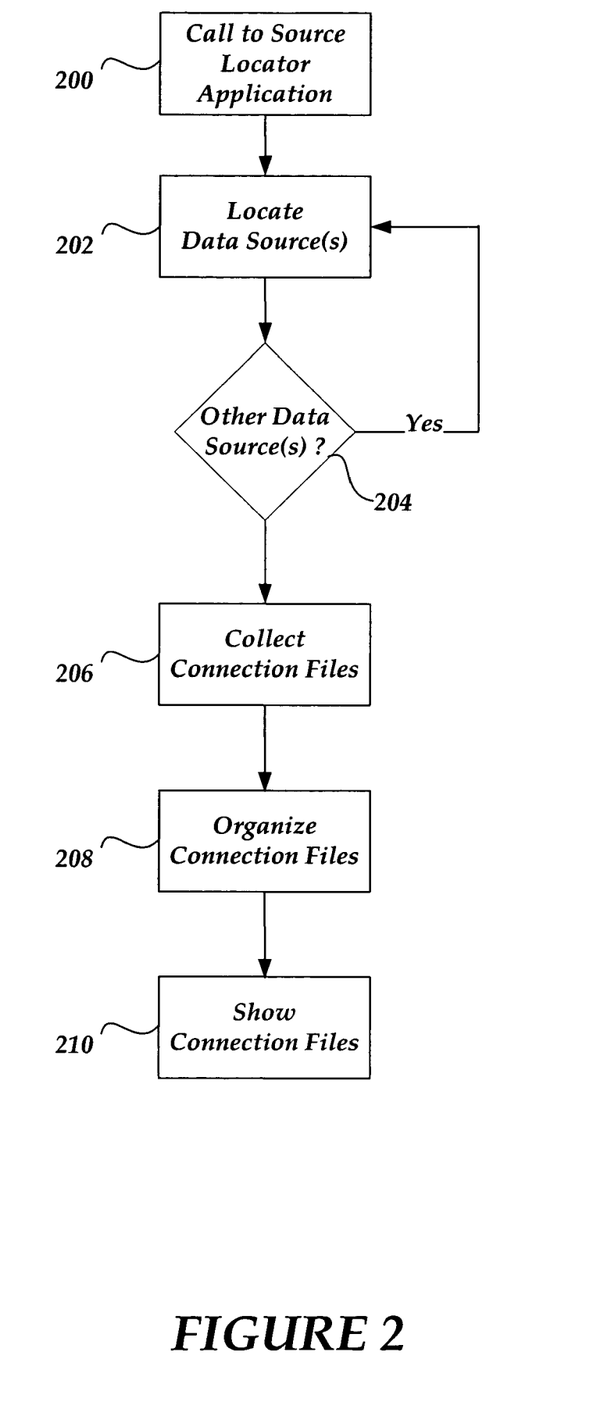
FIG. 2 is a flow diagram depicting a method of locating, accessing, and displaying one or more files associated with one or more data sources.

FIG. 2 is a flow diagram depicting a method of locating, accessing, and displaying one or more files associated with one or more data sources, in accordance with an embodiment. At 200, a source locator application is called, such as the source locator application 100 described above. For example, the source locator application may be called in conjunction with a call to a data link library (DLL), such as a call to Portal Connect.DLL, MSO.DLL, etc. The associated DLL loads, and locates user servers, which can be queried to return a list of servers or DCLs which are stored in an accessible registry for access by the source locator application 100.

As described above, the source locator application 100 is configured to locate and access one or more connection files associated with one or more data sources. At 202, the source locator application 100 locates one or more connection files associated with one or more data sources. In an embodiment, the source locator application 100 locates local and remote connection files, located on a user's computing device, local network, distributed computing network, etc.

For example, the source locator application 100 can locate one or more connection files by analyzing one or more folders or locations on a hard drive or other storage device. This may include, but is not limited to, accessing: various paths stored in one or more registries (described above); information associated with My Documents/My Data Sources folder; ODC and DCL information; uniform resource locators (URL) (e.g. URL associated with a SHAREPOINT server); ODBC information; and, other relevant information for locating data sources. In an embodiment, the source locator application 100 may use an application programming interface (API) to query various libraries and other sources, returning a list of URLs, which are sent to a registry, accessed, and used in displaying one or more connection files associated with one or more data sources.

With continuing reference to FIG. 2, at 204, if there are remaining data sources to locate, the flow returns to 202. If there are no remaining data sources to locate at 204, the flow proceeds to 206. At 206, the located connection files are collected and stored. At 208, the collected connection files are organized by type or some other criteria. At 210, the organized collection of connection files can be displayed on a display device in a user-friendly interface. As described below, distinctive textual, iconic, and/or other identifying information can be used to provide information to a user of the user interface, once the source locator application 100 has located one or more connection files associated with one or more data sources.

Additionally, a user can view and interact with the user interface using an input device, such as a mouse for example, and an output device, such as a display for example. As described below, a user can interact with the connection files by selecting one or more connection files using the user interface, which passes the information associated with data source back to the application that the user is currently using, such as a spreadsheet application for example. The application can then use the data source associated with the connection file.

Figure 3:
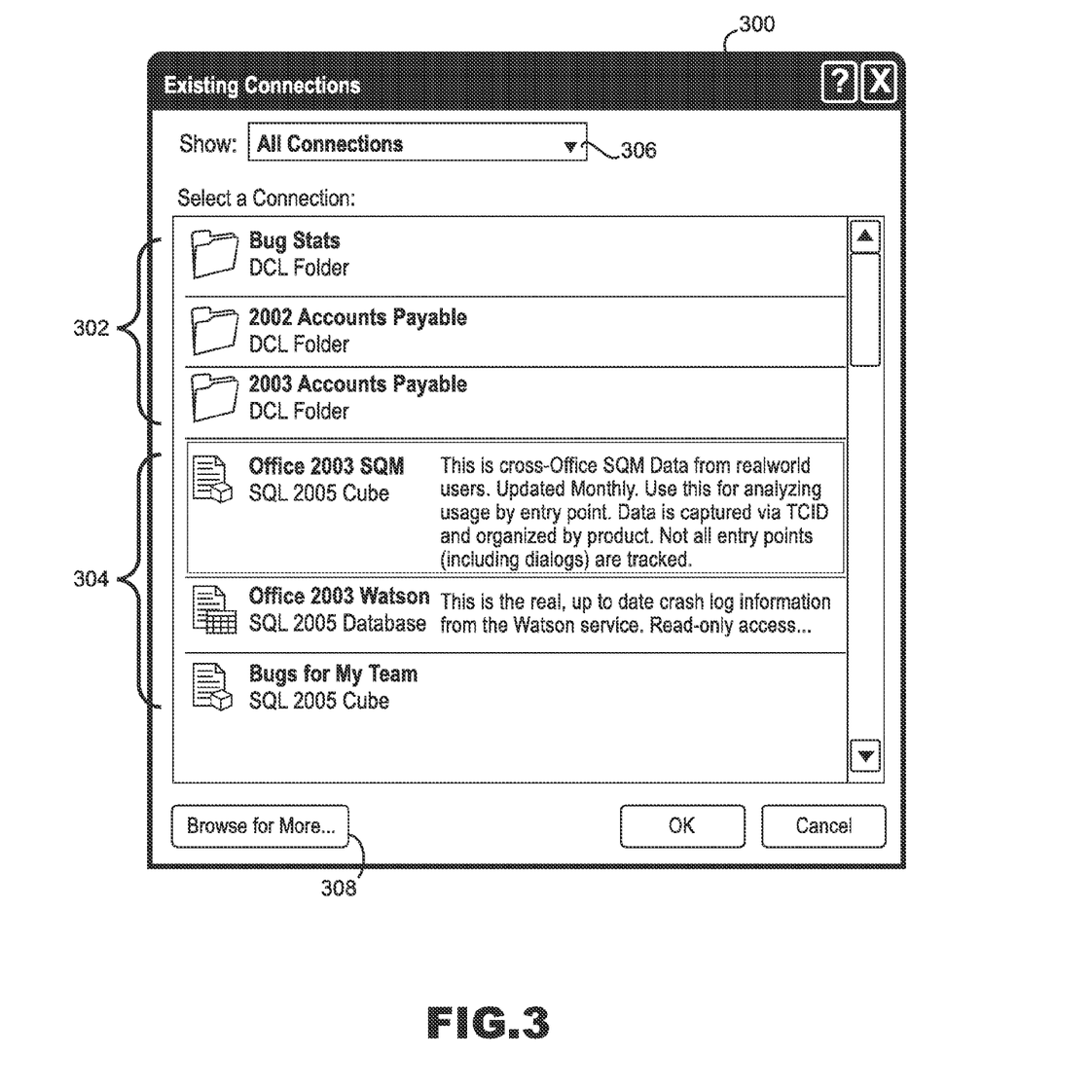
FIG. 3 depicts a user interface for presenting one or more connection folders and connection files.

FIG. 3 depicts a user interface 300 for presenting one or more connection folders 302 and/or files 304 in accordance with an embodiment. Each connection folder 302 includes a folder icon, a title, and a description which identifies a data source library associated with one or more connection files. Each connection file 304 includes a file type icon, a title, and a description which identifies a specific data source. A folder 302 can be shown for cases when a registry has more than one listed DCL. For example, various names and descriptions can be provided by the person(s) who set up a DCL and populated it with ODC files. The DCL can contain a number of connection files. The DCL improves discoverability of connections and assist users in managing data source connections since information about data sources can change, such as an associated server name, OLAP cube name, table name, etc.

An illustrative example follows in which a database is moved from a test server to a production server. For organizations that have many authors, it may be difficult to communicate these changes to all the right people. Moreover, there may be hundreds of existing workbooks that need to have their data connections updated. The DCL helps solve these problems because users only need to update a single connection file in the DCL with new information. Thereafter, workbook authors will get the right connection information the next time they use that connection file, and any existing workbooks that were created using the connection file will now have their connections updated automatically the next time that workbook's data is refreshed.

With continuing reference to FIG. 3, the user interface 300 also includes a filter 306 (in the form of a drop-down menu for example). The filter 306 is configured to filter connections according to preference. For example, a user can use the filter 306 to view workbook connections, server connections, local connections, etc. using the filter 306 to select an appropriate display. In FIG. 3, a user has used the filter 306 to view "all connections." A button 308 is provided to allow a user to browse and/or locate other connections and/or data sources that may not have been located by the source locator application. A user can select a folder 302 to view and select connection files 304 associated with the folder 302. A user can select a connection file 304 to use a data source associated with the connection file 304.

The user interface 300 also includes an "Open" button (not shown). This button is disabled on launch of the user interface. If a user highlights a file, the Open button becomes active. When a user double clicks or highlights a file and clicks the Open button, the name of the file is returned to the calling application to open the file natively. If a local file cannot be opened, an error value can be returned to the calling application. For example, an alert such as: "Cannot open file: The file may is in use or not accessible" may be used. If a network path is not accessible, an error value such as: "Network location not available: Please contact your administrator" may be used. Additionally, an alert may be displayed if a user attempts to access a DCL that they do not have permissions for. For example, an alert such as: "Access Denied: You might not have permission to use this network resource. Contact the Administrator of this server to find out if you have access permissions" may be used.

Figure 4A:
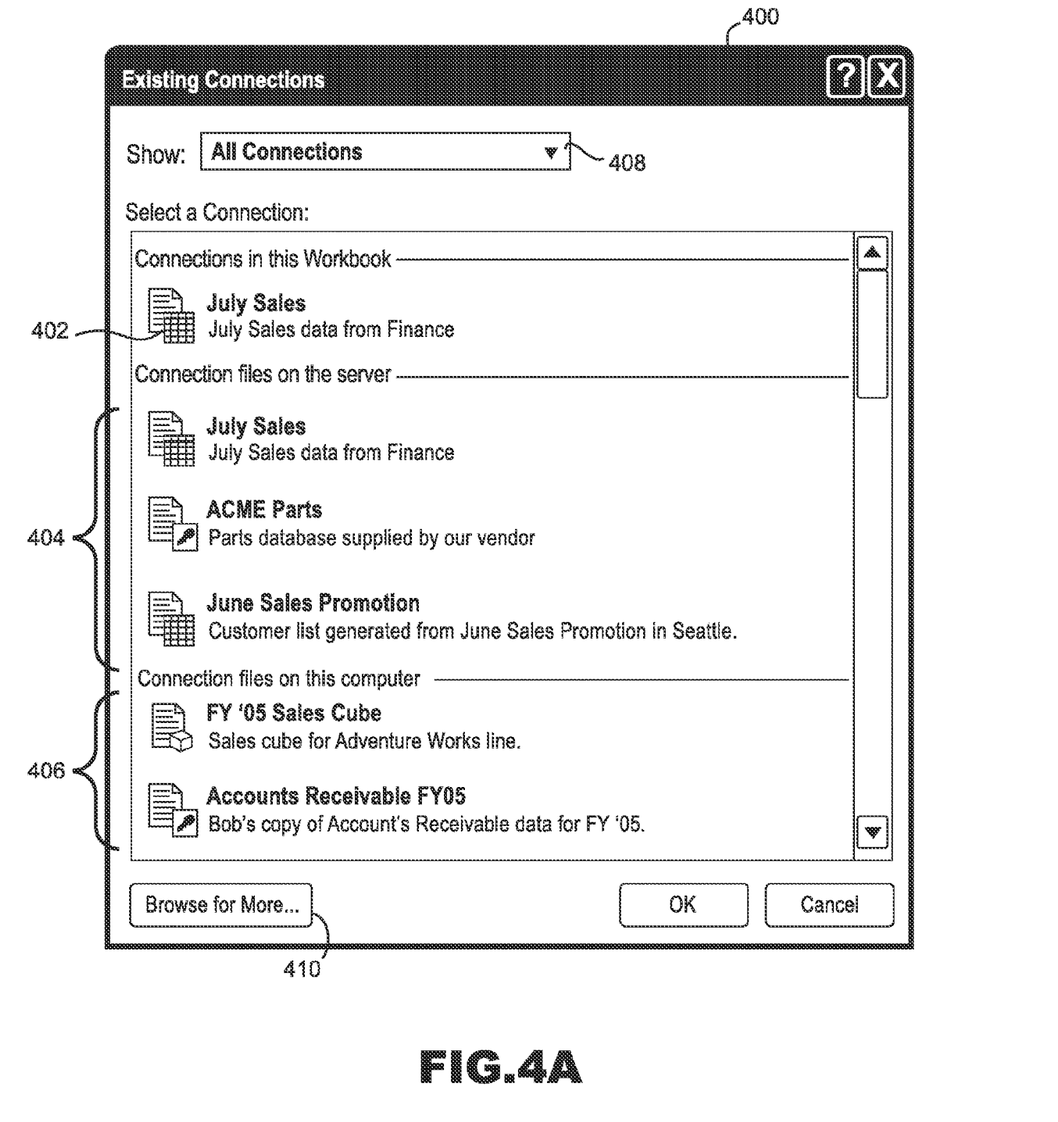
FIGS. 4A-4B depicts a user interface for presenting one or more connection files.

FIG. 4A depicts a user interface 400 for presenting one or more connection files 402, 404, and 406 in accordance with an embodiment. As shown in FIG. 4A, one connection file 402 is associated with a workbook, three connection files 404 are associated with a server, and two connection files 406 are on a local computer. Each connection file 402-406 includes a file type icon, a title, and a description which identifies a specific data source. The user interface 400 is configured to organize each connection file 402-406 by location and/or type. The user interface 400 also is configured to provide a "tool tip" when a user hovers over a particular item, such as a connection file 402-406. The tool tip is configured to show an associated path when a user hovers over an item. For example, there are two cases of "July Sales" shown in FIG. 4A. If a user hovers over either item, the full file path is displayed which identifies a particular file to the user.

Figure 4B:
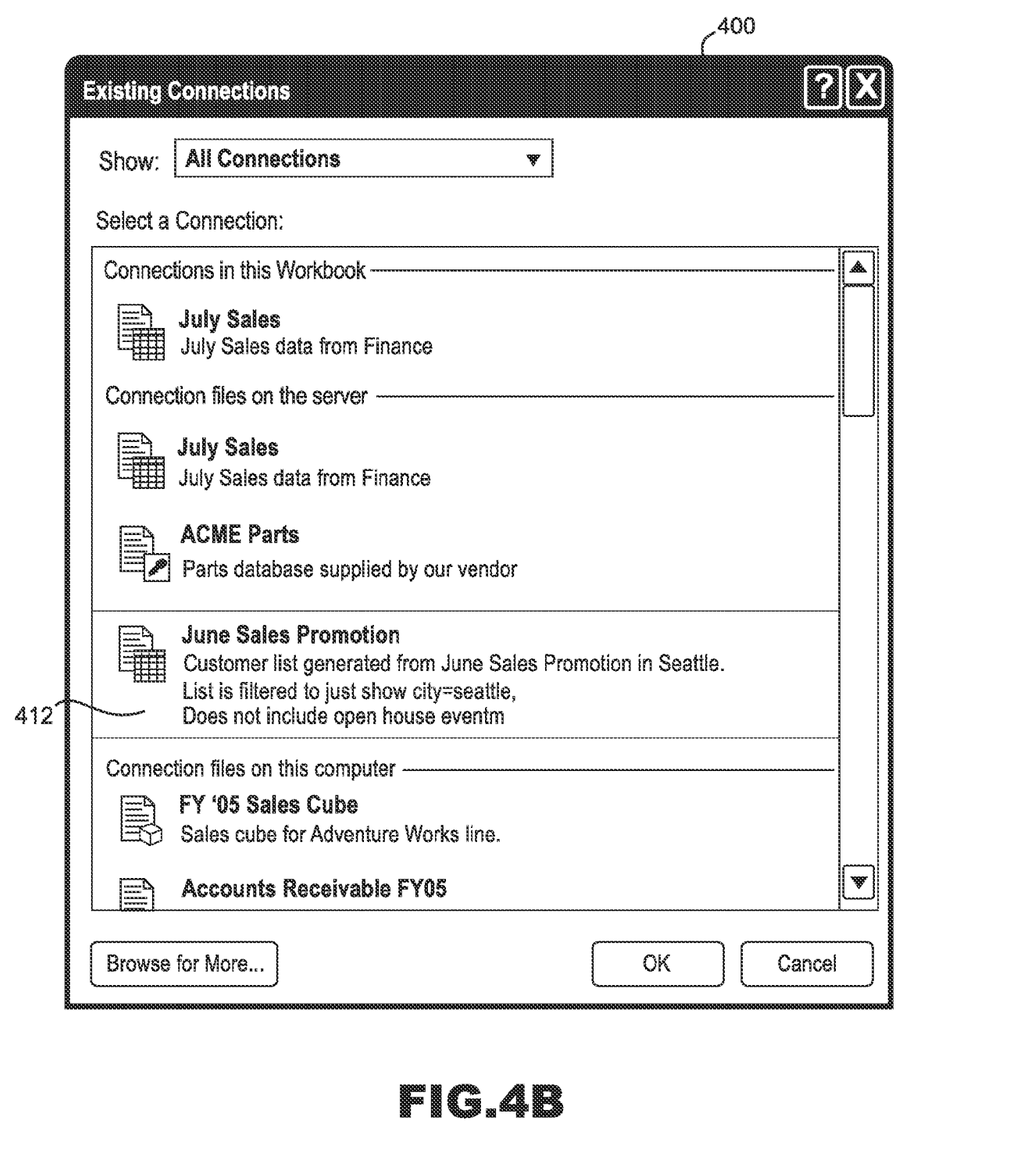

The user interface 400 also includes a filter 408 (in the form of a drop-down menu for example). The filter 408 is configured to filter connections according to preference. For example, a user can use the filter 408 to view workbook connections, server connections, local connections, etc. using the filter 408 to select an appropriate display. In FIG. 4A, a user has used the filter 408 to view "all connections." A button 410 is provided to allow a user to browse and/or locate other connections and/or data sources that may not have been located by the source locator application. FIG. 4B depicts the user interface 400 of FIG. 4A wherein a user has clicked on "June Sales Promotion" which has expanded the description 412 of the associated connection file.

Figure 5:
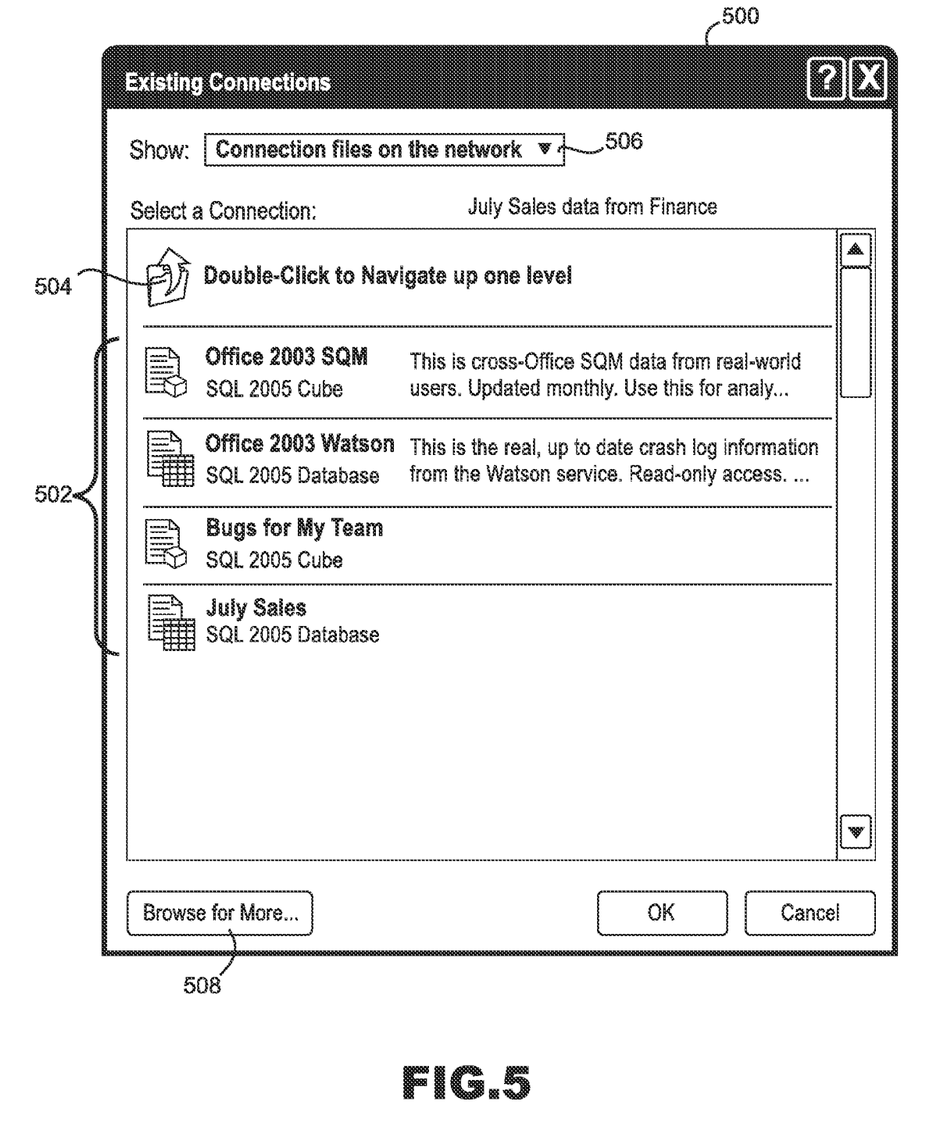
FIG. 5 depicts a user interface for presenting one or more connection files.

FIG. 5 depicts a user interface 500 for presenting one or more connection files 502 in accordance with an embodiment. The user interface includes a button 504 for navigating to a prior location. As shown in FIG. 5, a user has used the filter 506 to view connection files on a network. Each connection file 502 includes a file type icon, a title, and a description which identifies a specific data source. The user interface 500 is configured to organize each connection file 502 by location and/or type. A button 508 is provided to allow a user to browse and/or locate other connections and/or data sources that may not have been located by the source locator application. The various user interfaces described above can be configured according to a desired preference and the invention is not intended to be limited to any particular examples and/or embodiments described herein.

As described above, various connections or connection files can be provided to a user using the user interface. For example, connections can include database connections (e.g. OLADB, ODBC, etc.), workbook connection(s), connection files on a server, connections via a distributed computing network, and/or connection files on a local computer. The connections are collected and presented in a compact and user-friendly manner to a user using the user interface. An icon, textual information, and/or other description and identifying indicia can be used in conjunction with the connections to indicate a type of connection, making it easy for a user to determine a connection type at a glance. For example, as shown in the Table below, an icon in the form of a key can be used to identify a connection to a database, such as an ACCESS database. An icon in the form of an orange cube can be used to identify an Analysis Services cube. Thus, the user interface can be configured to indicate a type of connection for easy recognition by a user.

Table

| Icon | Type | Description |
|---|---|---|
| Varies. OS icon based on Extension | Non-ODC | Based on file extension(mdb, mde, ade, adp, udl, dsn, xls, htm, html, asp, mht, mhtml, txt, prn, csv, tab, asc, wk?, db, dbf, iqy, dqy, rqy, oqy, cub, xml, xsd, uxdc) |
|  | Access | File extension = ODC, ProgID=ODC.Access |
|  | Text | File extension = ODC, ProgID=ODC.Text |
|  | SQL Server | File Extension = ODC, ProgID=ODC.SQL |
|  | Analysis Services | File Extension = ODC, ProgID=ODC.AS |
|  | ODC Cube | File Extension = ODC, ProgID=ODC.Cube |
|  | ODC Table | File Extension = ODC, ProgID=ODC.Table |
|  | ODC Database | File Extension = ODC, ProgID=ODC.Database |

|  | Folder Icon | standard icon |
|  | Up one Level | standard icon |

As an example, consider a scenario where a user has received an e-mailed spreadsheet. The prior user of the spreadsheet had connected to external data and created a pivot table that is connected to the user's sales database. Using the user interface described above, the workbook connection is displayed identifying the server that includes the data. For workbook connections, the connection information is stored within the connection stream. In an embodiment, the workbook connection information resembles an XML architecture and includes, but is not limited to: connection type, username, password, and/or server name. As described above, the source locator application is configured to extract the workbook connection information for display in the user interface.

As another example, Patty, a Product Manager, wants to look at some data her IT analyst/administrator, Wayne, has made available. She starts EXCEL spreadsheet application, and clicks on the "Get Data" button. The user interface described above opens and she sees connections in use in the worksheet as well as other local and server data sources set up by Wayne. She easily identifies the appropriate data source from the helpful data source Title and Description. She clicks to highlight the data source and then clicks "Open". The connection is supplied to a select data view dialog where Patty chooses to display a List, Chart or PivotTable to display her data which is then shown.

Patty also needs to take over generating a report from a co-worker. The report relies on a data source which she has not previously used and is not in a "policy specified" server location. In the EXCEL spreadsheet application, she selects the launch point for importing data but it doesn't appear in the user interface. She clicks on the button to "Browse" for other sources. An open data dialog launches and she types in the path of the server to navigate to the appropriate server location.

In various embodiments, there may be many different entry points for using the user interface described above. For example, the user interface can be used when creating a new connection, viewing, and/or selecting existing connections. If a user selects a connection, the result can be relayed to a calling application. Other embodiments are contemplated.

Exemplary Operating Environment

Figure 6:
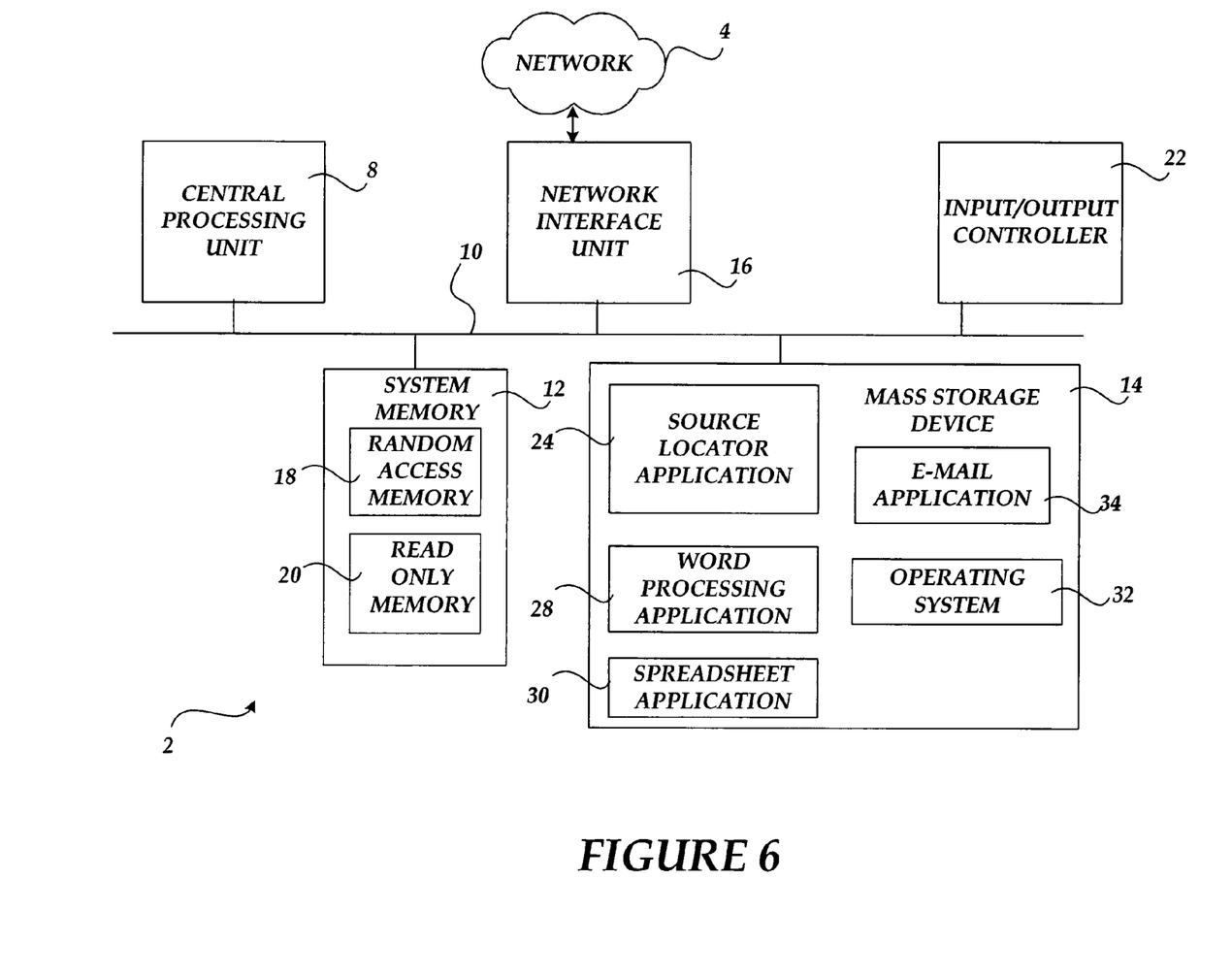
FIG. 6 is a block diagram illustrating a computing environment for implementation of various embodiments described herein.

Referring now to FIG. 6, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an illustrative operating environment for embodiments of the invention will be described. As shown in FIG. 6, computer 2 comprises a general purpose desktop, laptop, handheld, or other type of computer capable of executing one or more application programs. In particular, according to the various embodiments of the invention, the computer 2 is operative to execute a source locator application 24, as described in detail above. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store a source locator application 24, as described above, and other application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

We claim:

1. A computing system including a processor and a memory coupled with the processor, the computing system to provide information to a user comprising:
   a computer-implemented locating component to locate connection files associated with data sources including a data connection library associated with the connection files, wherein the connection files include local connection files that identify local data source connections and server connection files that identify server data source connections, the connection files to delineate connections to the data sources based in part on access at some time by an associated user;
   a computer-implemented collecting component to collect the located connection files;
   a computer-implemented organizing component to organize the collection of connection files; and
   a computer-implemented presenting component to present an at a glance user interface for data import including presenting the organized collection of connection files by simultaneously displaying connections including any local connections, server connections, and other existing connections based in part on the associated user's historical use of various data sources corresponding to the connection files as part of providing the user interface which includes displaying distinct contextual information about each data source corresponding to each connection file for user interaction, the presenting component further configured to present the collection of connection files after organizing the collection of connection files according to a connection type that includes a local connection type, a server connection type, and a type that is based in part on a file extension, wherein the at a glance user interface can be used to select, modify, and add connection files for associated data sources.

2. The computing system of claim 1, wherein the computer-implemented presenting component is further configured to present the collection of connection files after the computer-implemented organizing component organizes the collection of connection files according to the connection type selected from a group consisting of a local connection type, server connection type, workbook connection type, cube connection type, table connection type, and database connection type.

3. The computing system of claim 1, wherein the computer-implemented presenting component is further configured to present the collection of connection files using descriptive text and identifiers after the computer-implemented organizing component organizes the collection of connection files according to the connection type.

4. The computing system of claim 1, wherein the computer-implemented locating component is further configured to expose the connection files based in part on an examination of a registry of the computing system.

5. The computing system of claim 1, further comprising a programming interface to share the connection files.

6. The computing system of claim 5, wherein the programming interface is configured so a user can push one or more connection files associated with one or more data sources to one or more recipients.

7. The computing system of claim 1, wherein the computer-implemented locating component is further configured to expose the connection files associated with the data sources by locating a data connection library and one or more registry keys associated with the data sources.

8. A computer readable storage medium including executable instructions which, when executed, present information to a user by:
   exposing connections including a data connection library associated with one or more data sources, wherein the connections include local connections and server connections and delineate a connection to the one or more data sources based in part on access at some time by an associated user;
   collecting the connections to create a collection of connections; and
   presenting the collection of connections in a user interface for data import by simultaneously displaying the collection of connections including any local connections, server connections, and other existing connections based in part on the associated user's historical use of various data sources corresponding to the connection files as part of providing the interface which includes displaying distinct contextual information about each data source corresponding to each connection of the collection of connections for user interaction, the presenting further including presenting the collection of connection files after organizing the collection of connection files according to a connection type that includes a local connection type, a server connection type, and a type that is based in part on a file extension, wherein the user interface can be used to select, modify, and add connections for associated data sources.

9. The computer-readable storage medium of claim 8, wherein the instructions, when executed, present information to a user by exposing the connections associated with the one or more data sources by accessing at least one registry associated with the connections.

10. The computer-readable storage medium of claim 9, wherein the instructions, when executed, present information to a user by organizing the connections according to the connection type selected from a workbook connection type, cube connection type, table connection type, and database connection type.

11. The computer-readable storage medium of claim 9, wherein the instructions, when executed, present information to a user by exposing at least one database connection.

12. The computer-readable storage medium of claim 8, wherein the instructions, when executed, present information to a user as part of sharing one or more of the connections.

13. The computer-readable storage medium of claim 8, wherein the instructions, when executed, present information to a user by using an application programming interface (API) to expose the connections associated with at least one networked server.

14. The computer-readable storage medium of claim 8, wherein the instructions, when executed, present information to a user using descriptive text and one or more icon identifiers after organizing the collection of connections according to the connection type.

15. A method of providing information comprising:
   locating a connection file associated with a data source including a data connection library associated with the connection file, wherein the connection file includes information associated with a connection to the data source at some time by an associated user and to locate the data source, the locating further including exposing the connection file by accessing at least one registry associated with the connection file including locating a registry key associated with the data source, wherein the connection file corresponds with connections including a local connection and a server connection;
   creating a collection of connection files including the located connection file and one or more other located connection files, the collection of connection files identifying local data source connections and server data source connections accessed at some time by the associated user;
   organizing the collection of connection files; and
   presenting the collection of connection files in a user-friendly interface used for data import by simultaneously displaying connections organized by type including any local connections, server connections, and other existing connections based in part on the associated user's historical use of various data sources corresponding to the connection files as part of providing the interface which includes displaying distinct contextual information about each data source corresponding to each connection file for user interaction, the presenting further including presenting the collection of connection files after organizing the collection of connection files according to a connection type that includes a local connection type, a server connection type, and a type that is based in part on a file extension, wherein the user-friendly interface can be used to select, modify, and add connection files for associated data sources.

16. The method of claim 15, further comprising locating one or more connection files associated with one or more available data sources as part of importing external data in an application based in part on a connection type selected from workbook connection type, cube connection type, table connection type, database connection type, and a text connection type.

17. The method of claim 15, further comprising sharing the connection file.

18. The method of claim 15, further comprising interacting with the collection of connection files using the interface as part of importing the external data into one of a spreadsheet application, a database application, a word processing application, and a drawing application.

* * * * *

UNITED STATES PATENT AND TRADEMARK OFFICE
CERTIFICATE OF CORRECTION

| | | |
|---|---|---|
| PATENT NO. | : 7,788,259 B2 | |
| APPLICATION NO. | : 11/490762 | |
| DATED | : August 31, 2010 | |
| INVENTOR(S) | : Eric W. Patterson et al. | |

It is certified that error appears in the above-identified patent and that said Letters Patent is hereby corrected as shown below:

In column 16, line 21, in Claim 16, after "from" insert -- a --.

Signed and Sealed this
Tenth Day of May, 2011

David J. Kappos
*Director of the United States Patent and Trademark Office*